US012578501B2

(12) United States Patent
Daly

(10) Patent No.: US 12,578,501 B2
(45) Date of Patent: Mar. 17, 2026

(54) METHODS AND SYSTEMS FOR SUBSURFACE MODELING EMPLOYING ENSEMBLE MACHINE LEARNING PREDICTION TRAINED WITH DATA DERIVED FROM AT LEAST ONE EXTERNAL MODEL

(71) Applicant: SCHLUMBERGER TECHNOLOGY CORPORATION, Sugar Land, TX (US)

(72) Inventor: Colin Daly, Abingdon (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 896 days.

(21) Appl. No.: 17/757,657

(22) PCT Filed: Dec. 17, 2020

(86) PCT No.: PCT/US2020/065620
§ 371 (c)(1),
(2) Date: Jun. 17, 2022

(87) PCT Pub. No.: WO2021/127186
PCT Pub. Date: Jun. 24, 2021

(65) Prior Publication Data
US 2023/0358917 A1 Nov. 9, 2023

Related U.S. Application Data

(60) Provisional application No. 62/949,673, filed on Dec. 18, 2019.

(51) Int. Cl.
*G01V 20/00* (2024.01)

(52) U.S. Cl.
CPC ................................... *G01V 20/00* (2024.01)

(58) Field of Classification Search
CPC ............ G01V 20/00; G01V 2210/624; G01V 2210/6244; G01V 2210/6246;
(Continued)

(56) References Cited

U.S. PATENT DOCUMENTS

2018/0188403 A1* 7/2018 Halsey ................... G01V 1/306
2018/0320485 A1 11/2018 Fei et al.
2019/0064389 A1 2/2019 Denli et al.

FOREIGN PATENT DOCUMENTS

WO 2018208634 A1 11/2018
WO 2019221717 A1 11/2019
WO 2020123101 A1 6/2020

OTHER PUBLICATIONS

Roubickova, Anna, Nick Brown, and Oliver Brown. "Using machine learning to reduce ensembles of geological models for oil and gas exploration." 2019 IEEE/ACM 5th International Workshop on Data Analysis and Reduction for Big Scientific Data (DRBSD-5). IEEE, 2019 (Year: 2019).*

(Continued)

*Primary Examiner* — Saif A Alhija
(74) *Attorney, Agent, or Firm* — Jeffrey D. Frantz

(57) ABSTRACT

Method and systems are provided that create one or more models of a subsurface geological formation (such as a reservoir characterization model of a hydrocarbon reservoir or a model of some other subsurface geological formation). The method and systems are configured to extend a machine learning ensemble (such as an ensemble tree-based machine learning model such as a random forest learning model) to use or embed data derived from one or more secondary models as part of the training operations of the machine learning ensemble and online use of the trained machine learning ensemble. Such data can provide information that supplements the information contained in the training data/ input data.

17 Claims, 5 Drawing Sheets

(58) Field of Classification Search
CPC ......... G01V 2210/644; G01V 2210/66; G01V
1/306; G06F 30/27; G06F 17/10; G06N
5/01; G06N 7/01; G06N 20/20
See application file for complete search history.

(56) References Cited

OTHER PUBLICATIONS

Oh, Hyun-Joo, et al. "Land subsidence susceptibility mapping using bayesian, functional, and meta-ensemble machine learning models." Applied Sciences 9.6 (2019): 1248 (Year: 2019).*
Laubach, Stephen E., et al. "The role of chemistry in fracture pattern development and opportunities to advance interpretations of geological materials." Reviews of Geophysics 57.3 (2019): 1065-1111 (Year: 2019).*
Extended Search Report issued in European Patent Application No. 20901603.9 dated Dec. 4, 2023, 11 pages.
Daly, C., "An application of an Embedded Model Estimator to a synthetic non-stationary reservoir model with multiple secondary variables", ARXIV.org, Cornell University Library, 201 Olin Library, Cornell University, Ithaca, NY 14853, 22 pages.
Lafferty et al., "Conditional Random Fields: Probabilistic Models for Segmenting and Labeling Sequence Data," Proceedings ICM-2001, 2001, 10 pages; available at: https://repository.upenn.edu/cis_papers/159.
Meinshausen., N., "Quantile Regression Forests," Journal of Machine Learning Research 2006, 7, pp. 983-999.
Linde et al., "Geological realism in hydrogeological and geophysical inverse modeling: a review", Advances in Water Resources, 86, pp. 86-101, 2015.
Search Report and Written Opinion of International Patent Application No. PCT/US2020/065620 on Mar. 9, 2021; 10 pages.
International Preliminary Report on Patentability of International Patent Application No. PCT/US2020/065620 on Jun. 30, 2022; 7 pages.

* cited by examiner

BEGIN

101 collect training data for a particular location in a reservoir; such training data includes a value for one or more secondary variables that characterize a geophysical attribute or property (such as seismic attributes) at the particular location in the reservoir as well as a ground truth label (known value) for a target variable that characterizes a geophysical attribute or property (such as porosity) at the particular location in the reservoir

103 use an external model to predict and store a value for the target variable (such as porosity) at the particular location in the reservoir

105 build a training data vector associated with particular location in the reservoir, where the training data vector includes the secondary variable training data of 101 and the predicted value for the target variable of 103; the training data vector is associated with the target variable ground truth label (known value) at the particular location in the reservoir

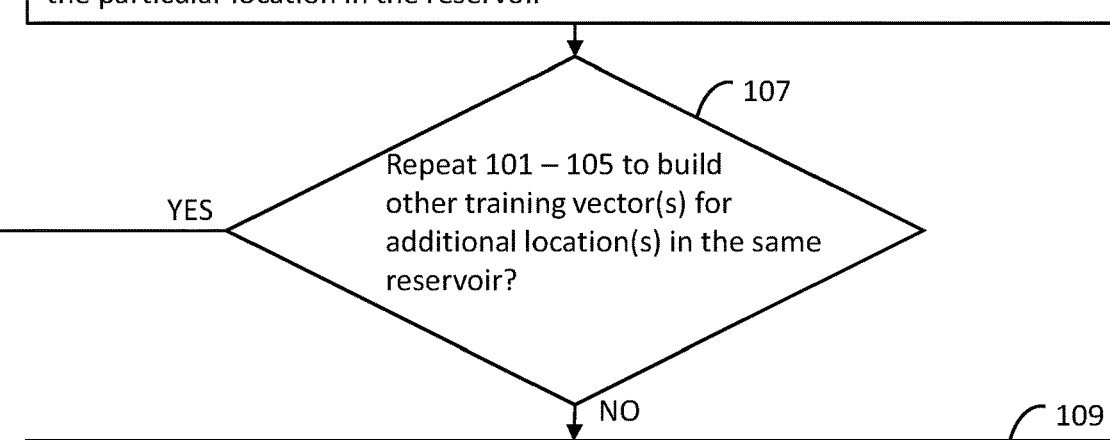

107

YES

Repeat 101 – 105 to build other training vector(s) for additional location(s) in the same reservoir?

NO

109 collect and store the training data vector samples and associated target variable ground truth labels for different locations in the same reservoir

111 use the training data vector samples and associated target variable ground truth labels of 109 to train an ensemble of machine learning models (e.g., ensemble of random forest decision tree models) to predict a value for the target variable (e.g., porosity) and optionally associated uncertainty given an input data vector corresponding to the training data vector samples

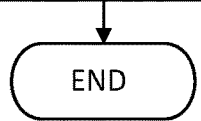

END

Fig. 1

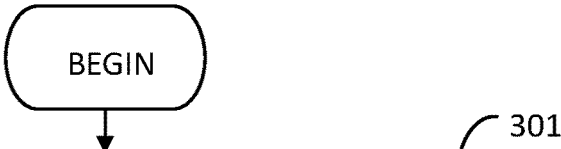

BEGIN

⌐ 301 obtain input data for a particular location in a reservoir where the value of a target variable (e.g., porosity) at the particular location is unknown; such input data includes a value for one or more secondary variables that characterize a geophysical attribute or property (such as seismic attributes) at the particular location in the reservoir

⌐ 303 use the external model to predict and store a value for the target variable (such as porosity) at the particular location in the reservoir

⌐ 305 build an input data vector associated with particular location in the reservoir, where the input data vector includes the secondary variable input data of 301 and the predicted value for the target variable of 303

⌐ 307 use the input data vector of 305 as input to the trained ensemble of machine learning models (e.g., trained ensemble of random forest decision tree models) of 109, which is configured to predict a value for the target variable (e.g., porosity) and optionally associated uncertainty given the input data vector of 305

⌐ 309 incorporate the predicted value of the target variable (e.g., porosity) and optionally associated uncertainty of 307 as part of a reservoir model that characterizes spatial distribution of geophysical properties of the reservoir

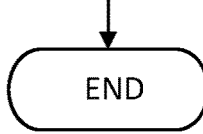

END

Fig. 3

METHODS AND SYSTEMS FOR SUBSURFACE MODELING EMPLOYING ENSEMBLE MACHINE LEARNING PREDICTION TRAINED WITH DATA DERIVED FROM AT LEAST ONE EXTERNAL MODEL

CROSS-REFERENCE TO RELATED APPLICATION(S)

This application is a National Stage Entry of International Application No. PCT/US2020/065620, filed Dec. 17, 2020, which claims priority from U.S. Provisional Patent Appl. No. 62/949,673, filed on Dec. 18, 2019, herein incorporated by reference in its entirety.

FIELD

The present disclosure relates to methods and systems that employ machine learning prediction to create a reservoir characterization model.

BACKGROUND

A reservoir characterization model is a three-dimensional representation of a subsurface hydrocarbon reservoir, including the spatial distribution of one or more petrophysical, geological or geophysical properties or attributes of the hydrocarbon reservoir. The reservoir characterization model quantifies properties or attributes within a subsurface volume that encompasses the hydrocarbon reservoir. The attributes or properties typically include the structural shape and thicknesses of the formation layers within the subsurface volume being modeled, their lithologies, and the porosity and permeability distributions. These attributes are relatively stable over long periods of time and can, therefore, be considered static. Porosity and permeability often vary significantly from location to location within the volume, resulting in heterogeneity. However, porosity and permeability are stable in the near-geologic timeframe and do not change due to the movement of fluids or gases through any of the formations pore spaces. The reservoir characterization model is also commonly referred to as a static model or geologic model.

The properties and attributes of the reservoir characterization model are typically defined by extrapolation from physical and chemical data related to the reservoir, including core data, well log data and seismic data. Computer-based methods and systems typically create a reservoir characterization model from relevant datasets that pertain to the reservoir. These datasets are compiled to create stratigraphic and structural frameworks that define the geometry of the reservoir. Using these frameworks, the facies, porosity, and permeability values are extrapolated horizontally and vertically throughout each layer. The facies rock types are typically modeled independently within each stratigraphic layer whereas the porosity of the model is dependent upon the facies model. Permeability is dependent upon both the facies and the porosity models. Several reservoir characterization models can be created from these attributes and then evaluated to select one or more "best" reservoir characterization models. The selected reservoir characterization model(s) can be used to simulate fluid flow in the reservoir during production. The fluid flow simulation can be used to plan and optimize production of hydrocarbons from the reservoir.

The current reservoir modeling methods and systems produce reservoir characterization models with uncertainty that can impact the accuracy of the follow-on reservoir simulation operations and the solutions developed therefrom.

SUMMARY

In embodiments, computer-based methods and systems are provided that create one or more models of a subsurface geological formation (such as a reservoir characterization model of a hydrocarbon reservoir or a model of some other subsurface geological formation). The model(s) (or parts thereof) can be output and displayed on a display screen to aid in understanding the spatial distribution of characteristics of the subsurface geological formation. The model(s) can be used to simulate fluid flow in the subsurface geological formation. The fluid flow simulation can be used to plan and optimize production of hydrocarbons from the subsurface geological formation, or plan and optimize other operations that involve fluid flow in the subsurface geological formation.

In embodiments, the methods and systems can combine traditionally 'non-standard' data combinations and provide results without the need to impose user-guided trends, variograms or other manual inputs, unlike traditional property modeling. The methods and systems can leverage artificial intelligence to determine the best and most likely property distribution characteristic of the subsurface geological formation. Furthermore, the methods and systems can also calculate probabilistic results that demonstrate the likely uncertainty in the model(s) based on the quality/quantity of the initial input data. The methods and systems can be significantly quicker than traditional property modeling techniques due to the minimal user input required.

In embodiments, the methods and systems can be configured to employ ensemble machine learning prediction for the spatial distribution of characteristics of the subsurface geological formation (e.g., hydrocarbon reservoir). The ensemble machine learning utilizes multiple machine learning models to obtain better predictive performance than could be obtained from any of the constituent learning models alone. For ensemble tree-based machine learning, the multiple machine learning models can employ decision trees as predictive models to go from observations about the subsurface geological formation represented in the branches of the decision trees to values or labels for the characteristics of the subsurface geological formation represented in the leaves of the decision trees. In one embodiment, the ensemble machine learning prediction can employ a random forest learning method.

In embodiments, the methods and systems can be configured to extend a machine learning ensemble (e.g. an ensemble tree-based machine learning model such as a random forest learning model) to use or embed data derived from one or more secondary models (also referred to as an external model(s)) as part of the training step. Such data can provide information that supplements the information contained in the training data.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIG. 1 is a flowchart illustrating a workflow where data generated by an external model is combined and embedded into the training operations of a machine learning ensemble that predicts a value of a target variable for a location within a subsurface reservoir given an input data vector of observations for that location;

FIG. 3 is a flowchart illustrating a workflow where data generated by an external model is combined and embedded into an input data vector that is used in conjunction with a trained machine learning ensemble to predict a value of a target variable for a location within a subsurface reservoir given an input data vector for that location;

DETAILED DESCRIPTION

Figure 2:
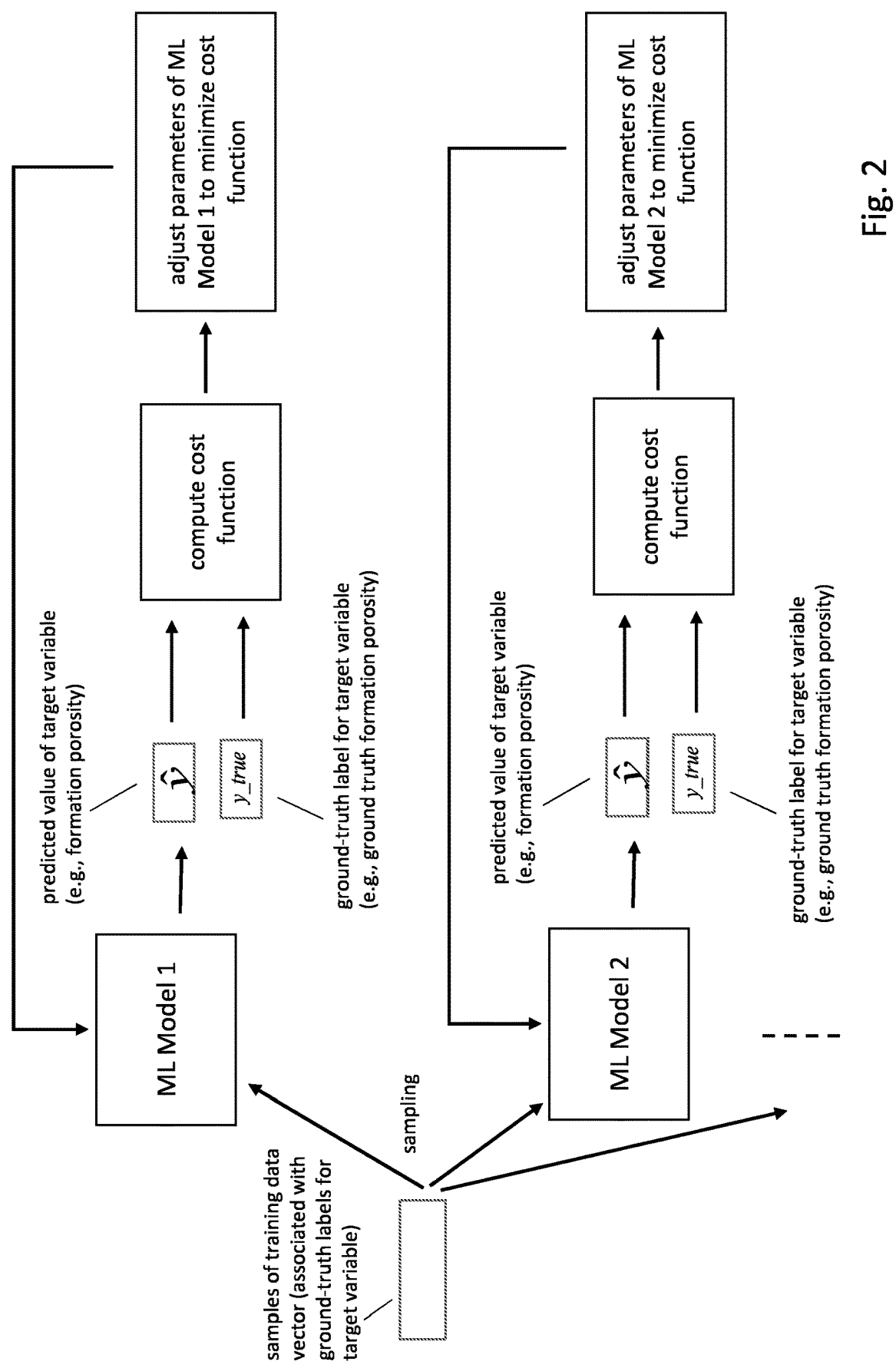
FIG. 2 is a schematic diagram that illustrates training operations of an ensemble of machine learning models.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

In embodiments, a computer-based system is provided that creates one or more models of a subsurface geological formation (which can be a reservoir characterization model of a hydrocarbon reservoir, or a model of some other subsurface geological formation). The model(s) (or parts thereof) can be output and displayed on a display screen to aid in understanding the spatial distribution of characteristics of the subsurface geological formation. The model(s) can be used to simulate fluid flow in the subsurface geological formation. The fluid flow simulation can be used to plan and optimize production of hydrocarbons from the subsurface geological formation, or plan and optimize other operations that involve fluid flow in the subsurface geological formation.

In embodiments, the system can combine traditionally "non-standard" data combinations and provide results without the need to impose user-guided trends, variograms or other manual inputs, unlike traditional property modeling. The system can leverage artificial intelligence to determine the best and most likely property distribution characteristic of the subsurface geological formation. Furthermore, the system can also calculate probabilistic results that demonstrate the likely uncertainty in the model(s) based on the quality/quantity of the initial input data. The system can be significantly quicker than traditional property modeling techniques due to the minimal user input required.

In embodiments, the system can be configured to employ an ensemble machine learning prediction for the spatial distribution of characteristics of the subsurface geological formation. Ensemble machine learning utilizes multiple machine learning models to obtain better predictive performance than could be obtained from any of the constituent learning methods alone. For ensemble tree-based machine learning, the multiple learning models can employ decision trees as predictive models to go from observations about the subsurface geological formation represented in the branches of the decision trees to values or labels for the characteristics of the subsurface geological formation represented in the leaves of the decision trees. In one embodiment, the ensemble machine learning prediction can employ a random forest learning method.

As used herein, the term "subsurface geological formation" refers to rock formations, structures, and other features beneath the land or sea-floor surface, including but not limited to hydrocarbon or petroleum reservoirs, water and saline aquifers, rock formations used for carbon sequestration, and other structures or features beneath the land or sea-floor surface.

Machine learning is a scientific discipline that is concerned with the design and development of algorithms that allow computers to learn based on training data. The computational analysis of machine learning models and their performance is a branch of theoretical computer science known as computational learning theory. The desired goal is to improve the machine learning models through experience (e.g., by applying the training data to the machine learning models in order to "train" the models). Machine learning, in other words, is the process of training computers to learn to perform certain functionalities. Typically, a machine learning model is designed and trained by applying the training data to the model. The model is adjusted (i.e., improved) based on how it responds to the training data.

A decision tree is a non-linear machine learning model that models a classification or regression problem as a series of binary "decisions" based on input features that leads to a final result stored in the tree's leaf nodes. Typically, thresholds for making decisions are selected for continuous variables to form binary decisions at each decision node while values for categorical variables may be mapped to each branch. Examples of machine learning algorithms for learning decision trees include the Iterative Dichotomiser 3 (ID3) algorithm, the C4.5 algorithm, CART, or other suitable algorithms.

While decision trees have many appealing properties, one significant disadvantage is that they are often prone to over-fitting, leading to increased generalization error. To overcome this problem, ensemble learning methods have been developed that combine collections of decision tree models (or an ensemble of decision trees or decision tree ensemble), with bootstrap sampling and other elements of randomization to produce models with higher degrees of accuracy and precision. For example, one well-known ensemble method for decision trees is the random forest learning method, which may be used for regression-type and classification-type problems. The random forest learning method employs a collection of decision trees and outputs the target variable value that is the mean of the output generated by the individual decision trees (for regression-type analysis) or the mode of the class labels output by the individual decision trees (for classification-type analysis). Other examples of decision tree ensembles include bagging decision trees, boosted trees, and rotation forest. Ensemble learning methods use multiple machine learning models to obtain better predictive performance than can be obtained from any of the constituent models.

In embodiments, the system can be configured to extend a machine learning ensemble (e.g. an ensemble tree-based machine learning model such as a random forest learning model) to use or embed data derived from one or more external models as part of the training step. Such data can provide information that supplements the information contained in the training data.

For example, consider the example where the machine learning ensemble is being trained to estimate a spatial variable (target variable) such as porosity or permeability using available secondary variable training data such as seismic attributes at different TVD and stratigraphic depth of a reservoir. These secondary variables are assumed to be known at the training data locations as well as at other locations where it is desired to estimate the target variable. In a naïve implementation, the machine learning ensemble can be trained using the vector of training data together with observations (or labels) of the target variable (such as porosity or permeability) at different locations to construct a model of the distribution of the target variable of the reservoir as a function of spatial location. This trained machine learning model can then be applied to make estimates of the target variable (such as porosity or permeability) at all required locations using the secondary variables which are known at those locations. Knowledge of the secondary variables at those locations together with the trained machine learning model are sufficient to make the prediction. However, an important control on the spatial distribution of the target variable is the continuity or correlation length of the target variable. This control can be provided by several types of external petrophysical models (such as the Kriging model for porosity) that estimate the spatial distribution of the target variable in a reservoir. Note that this control is not in the form of data, so it cannot be used directly in the machine learning algorithm. Instead, the control carries useful information and thus it must be generated by the external petrophysical model and the results embedded into the training and prediction operations of the machine learning ensemble.

In embodiments, data generated by an external model(s) can be combined and embedded into the training operations of the machine learning ensemble as follows. For each respective machine learning model (e.g., decision tree) of the machine learning ensemble, and for each training data location used in the construction of the respective machine learning model (e.g., decision tree), one or more external models (such as a petrophysical model such as the Kriging model for porosity) is used to predict or estimate the value of the target variable (e.g., porosity) at that training location by cross validation (i.e., not using the sample itself). This means that at each training location, as well as the observed values of the secondary variables, we now have an estimate made by the external model of the value of target variable (e.g., porosity) at that location. This numerical estimate tells us about the predictive behavior of the external model at the training location in the same way as the numerical observations of the secondary variables tell us about the predictive behavior of those secondary variables at the training location. By considering this numerical estimate as an extra variable observed at the training location, we can construct an extended vector of training data for the training location that includes the secondary variable observations at the training location and the numerical estimate of the target variable at the training location made by the external model. Machine learning code (such as a Random Forest) can use its standard algorithm in conjunction with samples of the extended vector of training data for multiple training locations to train each machine learning model (e.g., decision tree) of the machine learning ensemble to predict the target variable (e.g., porosity) given input data corresponding to the extended vector of training data. Hence, the machine learning code learns about the relative qualities of secondary variables and embedded target variable predictions made by the external model and combines them to produce a better predictor of the target variable (e.g., porosity).

At a location where an estimate of the target variable is required, assumption observations of all the secondary variables for such location is obtained, and the external model can be used to make an estimate of the target variable at that location. Together these provide an input data vector that is fed to the trained machine learning ensemble (e.g., decision trees) to estimate the target variable at the required location in the usual way appropriate for the machine learning algorithm. For example, for a Random Forest, the estimate of the target variable (e.g. porosity) as a function of spatial location in the subsurface reservoir can be determined from the mean of all the target variable predictions produced by the ensemble of decision trees from the input data vector pertaining to a location in the subsurface reservoir.

In cases where the ensemble of target variable predictions produced by the ensemble of machine learning models (e.g., decision trees) can be considered to give a good estimate of the conditional distribution at a target location—such as the Random Forest for example—the estimate of the conditional distribution at the target location can be used to provide at least one additional product selected from the group which includes:

1) an uncertainty estimate.
2) a stochastic modeling algorithm capable of building realizations of the spatial target variable exploring the uncertainty space.
3) non-linear estimates of exceedance probabilities, $P[Z(x)>c]$, the probability that the spatial target variable Z at location x is bigger than a cutoff c.

The additional products of 1) and 3) can be determined by using the set of predictions as an estimate of the conditional distribution and extracting uncertainty and exceedance probabilities from that. The additional product 2) can be determined using a novel approach. Since the conditional distribution has been estimated at each target location, a method known in the literature as P Field Simulation can be modified to perform a condition uniform distribution realization of a Random Function model with a prescribed variogram. However, since there will often be a non-unique solution to the quantile that matches the observed target value at the well locations, one of these is sampled at each well location in a consistent manner. A variant of a Monte Carlo algorithm by Xavier Freulon gives an appropriate solution. In this algorithm, a first step selects appropriate quantile values from the conditional distributions estimated at the well locations using a Monte Carlo sampling such that the sampled values match the target variable observed at the well locations and follow the prescribed variogram. A second step produces a conditional realization of a uniform spatial random field at the set of target locations with the prescribed variogram and which matches the sampled uniform values at the well locations. A third step samples from the family of conditional distributions with the conditional uniform random field at the target locations to give the realization of the spatial target variable exploring the uncertainty space.

FIG. 1 illustrates an example workflow where data generated by an external model is combined and embedded into the training operations of a machine learning ensemble that predicts a value of a target variable (such as porosity or permeability) for a location within a subsurface reservoir given an input data vector of observations for that location.

The workflow begins in block 101 by collecting training data for a particular location (or training location) in a reservoir. The training data includes a value for one or more secondary variables that characterize a geophysical attribute or property (such as seismic attributes) at the particular location in the reservoir as well as a ground truth label (known value) for a target variable that characterizes a geophysical attribute or property (such as porosity or permeability) at the particular location in the reservoir. The training data, including the value for one or more secondary variables and the ground truth label (known value) for the target variable, can be measured by surveys, test well analysis and interpretation, rock and fluid sampling and analysis, or other methods of reservoir characterization.

In block 103, an external model is used to predict and store a value for the target variable at the particular location in the reservoir. For example, in an embodiment where the target variable represents porosity of the reservoir, a petro-physical model such as the Kriging model for porosity can be used to predict and store a value for the target variable porosity at the particular location in the reservoir.

In block 105, a training data vector associated with a particular location in the reservoir is generated or built. The training data vector includes the secondary variable training data of 101 and the predicted value for the target variable of 103. The training data vector is associated with the target variable ground truth label (known value) at the particular location in the reservoir.

In block 107, the operations check whether the operations of 101 to 105 should be repeated for additional locations in the same reservoir. If so (e.g., for the case where sufficient training data has not yet been collected), the operations revert back to 101 to repeat the operations of 101 to 105 for additional locations in the same reservoir. If not (e.g., for the case where sufficient training data has been collected), the operations continue to block 109.

In block 109, the training data vector samples and associated target variable ground truth labels of 105 for different locations (training locations) in the same reservoir are collected and stored for training the ensemble of machine learning models.

In block 111, the training data vector samples and associated target variable ground truth labels that are collected and stored in 109 are used to train an ensemble of machine learning models (e.g., ensemble of random forest machine decision tree learning models) to predict a value for the target variable (e.g., porosity or permeability) and optionally associated uncertainty (or other product) given an input data vector corresponding to the training data vector samples.

FIG. 2 illustrates training operations of a machine learning ensemble. The machine learning ensemble includes a set of two or more machine learning models (labeled "ML Model 1", "ML Model 2", etc.) that are trained using the training data vector samples and associated target variable ground truth labels that are collected and stored in 109. In embodiments, the machine learning ensemble includes an ensemble of random forest decision tree models. In this embodiment, the training operations can employ random sampling of the training data vector samples that are collected and stored in 109, such as through randomized feature bagging or other means. Such random sampling is used to reduce the correlation between the random forest decision tree models that result from the training operations.

FIG. 3 illustrates an example workflow where data generated by an external model is combined and embedded into an input data vector that is used in conjunction with a trained machine learning ensemble to predict a value of a target variable for a location within a subsurface reservoir given an input data vector for that location.

The workflow begins in block 301 by obtaining input data for a particular location in a reservoir where the value of a target variable (e.g., porosity or permeability) at the particular location is unknown. The input data includes a value for one or more secondary variables that characterize a geophysical attribute or property (such as seismic attributes) at the particular location in the reservoir. The input data can be measured by surveys, test well analysis and interpretation, rock and fluid sampling and analysis, or other methods of reservoir characterization.

In block 303, an external model is used to predict and store a value for the target variable at the particular location in the reservoir. For example, in an embodiment where the target variable represents porosity of the reservoir, a petro-physical model such as the Kriging model for porosity can be used to predict and store a value for the target variable porosity at the particular location in the reservoir.

In block 305, an input data vector associated with a particular location in the reservoir is generated or built. The input data vector includes the secondary variable input data of 301 and the predicted value for the target variable of 303.

In block 307, the input data vector of 305 is used as input to the trained ensemble of machine learning models (e.g., trained ensemble of random forest decision tree models) of 109, which is configured to predict a value for the target variable (e.g., porosity or permeability) and optionally associated uncertainty (or other product) given the input data vector. The sampling of the input data vector of 305 for input to the respective machine learning models of the ensemble follows the sampling scheme of the training operations (109). For example, in embodiments where the ensemble of machine learning models includes an ensemble of random forest decision tree models, the sampling of the input data vector of 305 can employ the same random sampling scheme of the training data vector samples used in the training operations (109).

In block 309, the predicted value of the target variable (e.g., porosity or permeability) and optionally associated uncertainty (or other product) of 307 are incorporated into a reservoir model that characterizes spatial distribution of geophysical properties of the reservoir.

Figure 4:
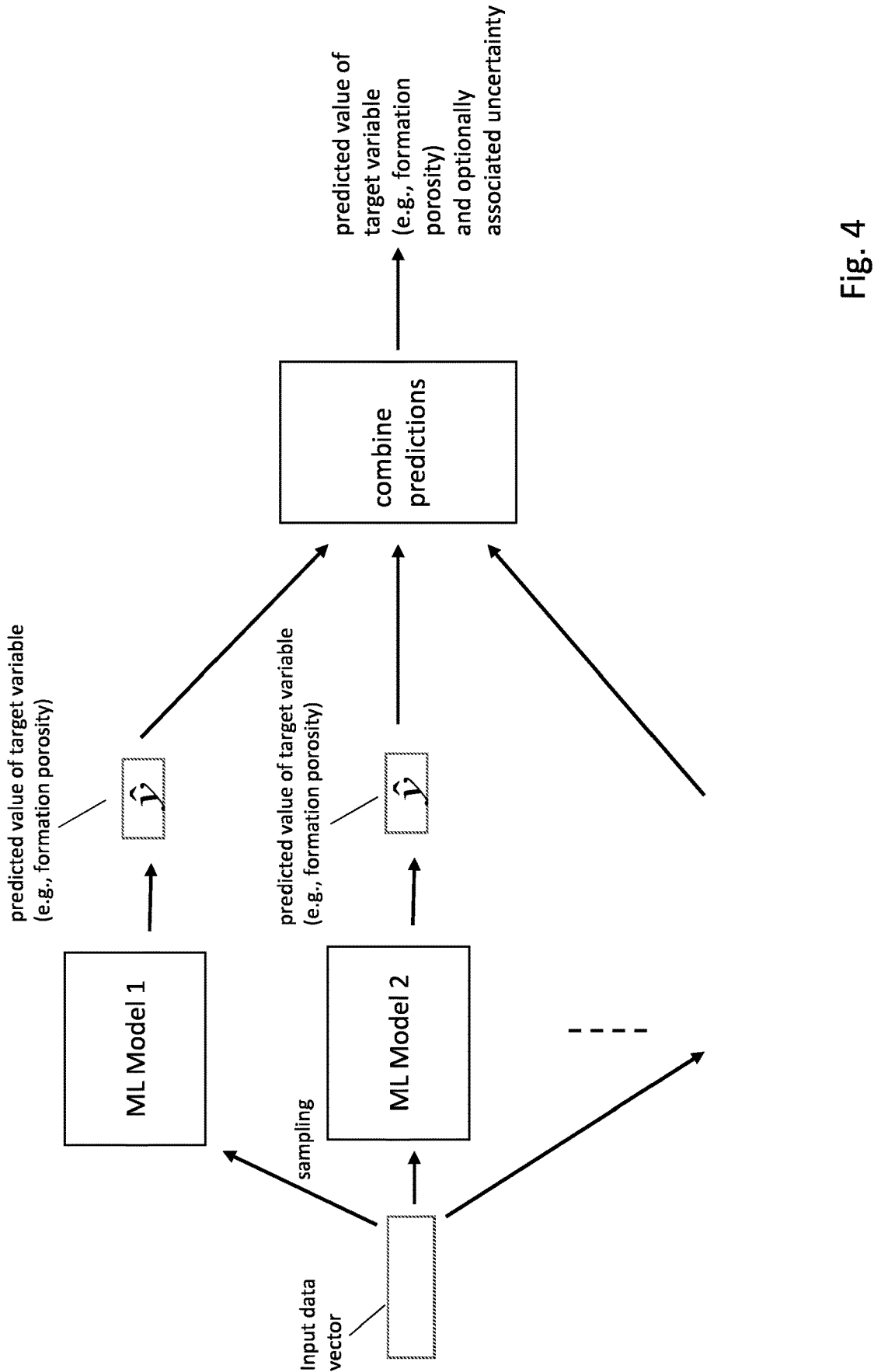
FIG. 4 is a schematic diagram illustrating operations of a trained machine learning ensemble as part of the workflow of FIG. 3.

FIG. 4 illustrates operations of a trained machine learning ensemble as part of block 307. The machine learning ensemble includes a set of two or more machine learning models (labeled "ML Model 1", "ML Model 2", etc.) that are trained as described herein (FIGS. 1 and 2). The trained machine learning models output respective predictions (values) for the target variable (e.g., porosity or permeability) at a particular reservoir location given observations from the input data vector corresponding to that particular location. The predictions (values) for the target variable (e.g., porosity or permeability) are combined (such as by averaging or other statistical analysis) to generate the predicted value of the target variable (e.g., porosity or permeability) and optionally associated uncertainty (or other product) as part of block 307. The sampling of the observations of the input data vector for input to the respective machine learning models of the ensemble follows the sampling scheme of the training operations (109). For example, in embodiments where the ensemble of machine learning models includes an ensemble of random forest decision tree models, the sampling of the observations of the input data vector can employ the same random sampling scheme of the training data vector samples used in the training operations (109).

In embodiments, the operations of FIGS. 3 and 4 can be carried out for a number of different locations in the reservoir to predict a value of the target variable (e.g., porosity or permeability) and optionally associated uncertainty (or other product) for the different reservoir locations. Such predicted target variable values and products can be incorporated into the reservoir model that characterizes spatial distribution of geophysical properties of the reservoir.

In one embodiment, the system can employ a machine learning model that belongs to the class of Conditional Random Fields (CRF) as described in Lafferty et al., "Conditional Random Fields: Probabilistic Models for Segmenting and Labeling Sequence Data," Proceedings ICM-2001, 2001. The form of CRF that is used in this embodiment can accommodate and embed existing spatial models using a Markovian hypothesis. Let $Z(x)$ be a target variable of interest at the location x, and let $Y(x)$ be a vector of secondary or auxiliary variables observed at x. Let $\{Z_i, Y_i\}$ be observations of the target and secondary variables observed in the field at the locations $\{x_i\}$, and finally let $Z^*_e(x) = f(\{Z_i, Y_i\})$ be a vector of pre-existing estimators of $Z(x)$. Then the Markov hypothesis that we require is the conditional distribution of $Z(x)$ given all available data $F^{Z(x)|All}(z)$ satisfies, $$F^{Z(x)|All}(z) = E[\mathbb{1}_{Z(x)<z} | Y(x), \{Z_i, Y_i\}] = E[\mathbb{1}_{Z(x)<z} | Y(x), Z^*_e(x)] \qquad \text{Eqn. (1)}$$

This states that the conditional distribution of $Z(x)$ given all the secondary values observed at x and given all the remote observations of $\{Z_i, Y_i\}$ reduces to the far simpler conditional distribution of $Z(x)$ given all the secondary values observed at x and the vector of model predictions at x.

In this embodiment, the target variable, $Z(x)$ can be porosity, and the secondary variables can be seismic attributes, stratigraphic coordinates, true earth coordinates, zone information and distance to faults. Variables representing estimated porosity from two simple kriging models are also embedded into CRF. Rather than spend time working on the inference of such models, we simply choose a long-range and a short-range model and allow the contribution of these models to be determined together with that of the secondary variables during construction of $F^{Z(x)|All}(z)$. This is motivated by the empirical observation that the main contribution of the embedded kriging porosity estimates in the new algorithm is to provide information about lateral continuity of the target variable. This choice allows this simplified version of the estimation process to be fully automated.

As described in Lafferty et al, an advantage of the CRF compared to a generative Bayesian model is that no effort is expended on establishing relationships between the predictor variables. In spatial models these involve stringent hypothesis such as the stationarity of the property of interest (perhaps coupled with some simple model of trend) and the stationarity of the relationship between the target variables and the explanatory variables (e.g. the hypothesis that the relationship between porosity and seismic attributes do not change spatially). One might object that our embedded models $Z^*_e(x)$ are constructed with such hypotheses. This is true, but their influence is mitigated in two ways. Firstly, the Markov hypothesis removes any direct influence of the construction of $Z^*_e(x)$, instead weighing its influence on the final estimate in an entirely symmetric way with the secondary variables, simply on their ability to predict target distribution. Secondly, the principle impact of stationarity in the classic model is seen in stochastic realizations which need to invoke the full multivariate distribution and therefore lean heavily on the hypotheses. This can be greatly avoided in the current proposal.

In embodiments, a highly successful non-parametric paradigm for estimating $F^{Z(x)|All}(z)$ can be employed based on Meinshausen, N., "Quantile Random Forests," Journal of Machine Learning Research 2006, 7, 983-999. The inference problem is complicated by the dependency on the embedded models $Z^*_e(x)$. If these estimators make use of $Z(x)$ in the estimation of $Z(x)$, we clearly have introduced a bias. We avoid this bias by the simple expediency of training the decision forest on cross validated estimates. Thus, the training data set for each tree is $\{Z_i; Y_i, Z^*_{CVe}(x)\}$, where $Z^*_{CVe}(x)$ are cross validated model estimates at x. With the estimates of $F^{Z(x)|All}(z)$ at all target locations x, conditional realizations of the reservoir model can be produced. A modified conditional P field simulation can be used which honors data at the well locations, allows the final result to track any discontinuous shifts in the distribution (e.g. when Zone boundaries are crossed) and follows the local heteroscedasticity observed in the conditional distribution as well as the spatially varying relationship between conditioning variables and target.

In embodiments, the system can be configured to construct a reservoir characterization model of a subsurface hydrocarbon reservoir, which includes the spatial distribution of one or more properties (target variables) of a subsurface hydrocarbon reservoir. Applications to other spatial modeling problems can be considered where an external physical model carries information relevant to the target variable that is not solely contained in observed data. In still other applications, the system can be configured to perform non-spatial regression when relevant information is available through external models.

Advantageously, the system as described herein allows for the use of many secondary variables and allows for non-linear relationships between them. This is an improvement over the prior art which allows for only linear interactions between secondary variables and even then, necessitates great care to ensure that the data will not become collinear leading to singular matrices and failed solutions.

Moreover, the system needs little to no manual human interaction in many, or most cases, which can reduce the amount of time and manual user interaction required to construct the model.

Furthermore, while some 'hyperparameters' can exist in the system, it should be possible to do without them to give the user a simple workflow experience as compared to the prior art.

Finally, the system as described herein can be configured to provide a simple user interface experience which requires users to simply define the target variable they wish to predict, the secondary variables they want to use to calculate that prediction, the external models they want to additionally use in the prediction and a grid specifying the locations that they require the predictions to be made at.

Figure 5:
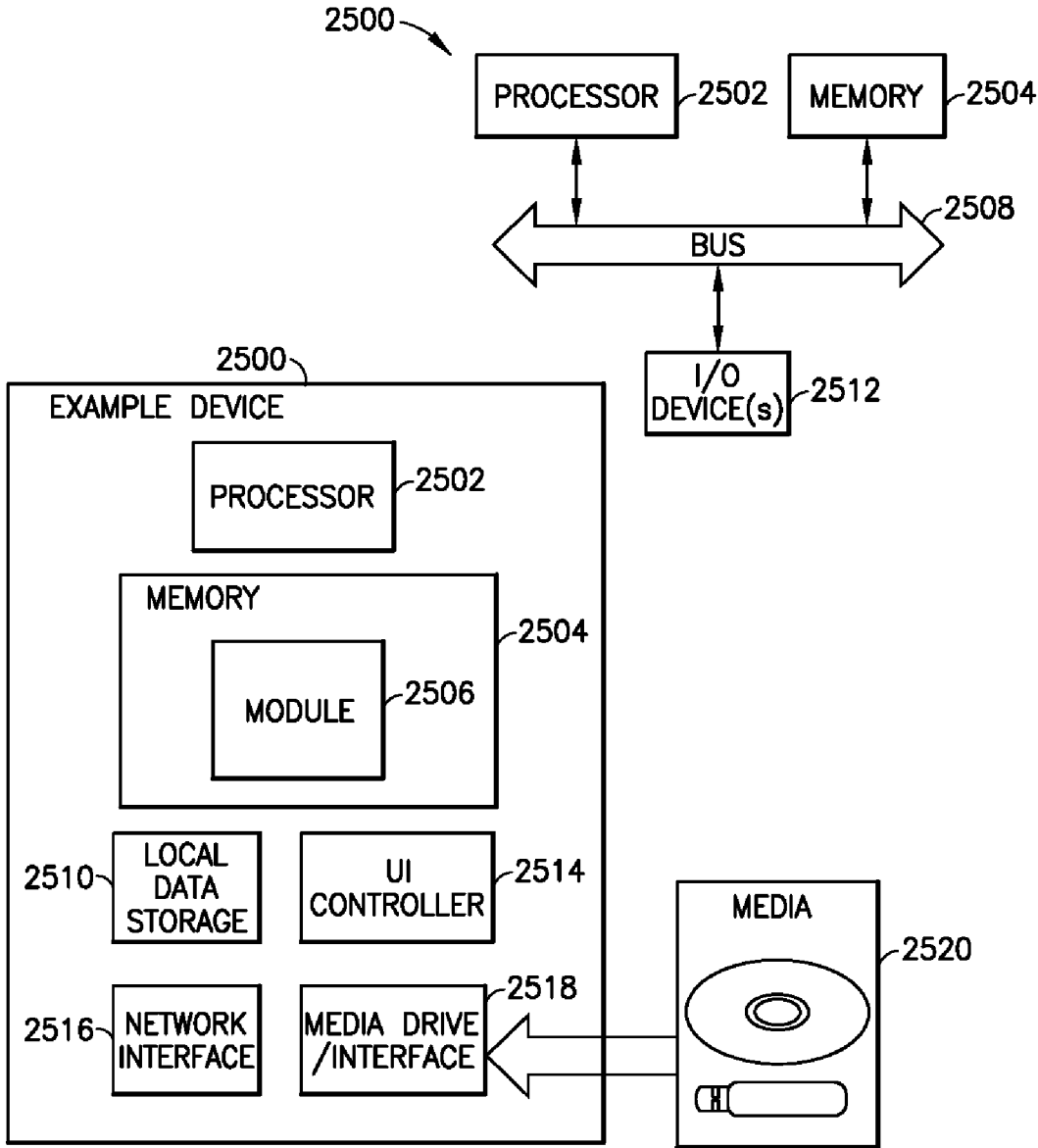
FIG. 5 is a functional block diagram of a computer processing system.

FIG. 5 illustrates an example device 2500, with a processor 2502 and memory 2504 that can be configured to implement various embodiments of the methods and systems for reservoir modeling as discussed in this disclosure. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, program-mable logic controllers (PLCs), etc.

Further, device 2500 should not be interpreted as having any dependency relating to one or a combination of com-ponents illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wire-less buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tan-gible media 2520, such as flash drives, optical disks, remov-able hard drives, software products, etc. In one possible implementation, logic, computing instructions, and/or soft-ware programs comprising elements of module 2506 may reside on removable media 2520 readable by media drive/interface 2518. Various processes of the present disclosure or parts thereof can be implemented by instructions and/or software programs that are elements of module 2506. Such instructions and/or software programs may reside on remov-able media 2520 readable by media drive/interface 2518 as is well known in the computing arts.

In one possible embodiment, input/output device(s) 2512 can allow a user (such as a human annotator) to enter commands and information to device 2500, and also allow information to be presented to the user and/or other com-ponents or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projec-tor), speakers, a printer, a network card, and so on.

Various processes of the present disclosure may be described herein in the general context of software or program modules, or the techniques and modules may be implemented in pure computing hardware. Software gener-ally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, mag-netic tape, magnetic disk storage or other magnetic storage devices, or any other tangible medium which can be used to store the desired information, and which can be accessed by a computer. Some of the methods and processes described above, can be performed by a processor. The term "proces-sor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Inte-grated Circuits (ASIC)), and/or programmable logic devices (e.g., a Field Programmable Gate Arrays (FPGA)). Any of the methods and processes described above can be imple-mented using such logic devices.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A computer-implemented method for creating a model of a subsurface geological formation, comprising:

training a machine learning ensemble comprising a plurality of machine learning models using training data as well as additional data derived from an external model, the additional data including an estimate of a value of a target variable derived from a cross validation of the value of the target variable at a location used to construct a respective machine learning model of the plurality of machine learning models, wherein such additional data provides training information that supplements the training data, and wherein the additional data derived from the external model comprises the estimate of the value of the target variable;

constructing an extended vector of the training data, the extended vector comprising:

a first secondary variable including a first observation at the location;

a second secondary variable including a second observation at the location, the second secondary variable having a non-linear relationship with the first secondary variable; and the estimated value of the target variable at the location;

using the trained machine learning ensemble to create the model based on the extended vector, the model relating to fluid flow in the subsurface geological formation; and modifying a drilling operation location in the subsurface geological formation based on the model.

2. A method according to claim 1, further comprising:

constructing a plurality of training data vectors including the extended vector, wherein each training data vector includes the training data and the additional data derived from the external model; and using the plurality of training data vectors to train the machine learning ensemble.

3. A method according to claim 2, wherein:

the training data of each training data vector includes at least one observation that characterizes a reservoir property or attribute.

4. A method according to claim 3, wherein:

the at least one observation is measured by a survey, test well analysis and interpretation, rock and fluid sampling and analysis, or other methods of reservoir characterization.

5. A method according to claim 1, wherein:

the machine learning ensemble comprises a plurality of tree-based machine learning models.

6. A method according to claim 5, wherein:

the plurality of tree-based machine learning models comprises a plurality of random forest decision-tree learning models.

7. A method according to claim 1, wherein:

the model comprises a reservoir characterization model of a subsurface hydrocarbon reservoir.

8. A method according to claim 7, wherein:

the reservoir characterization model includes a spatial distribution of at least one property of the subsurface hydrocarbon reservoir.

9. A method according to claim 8, wherein:

the at least one property of the subsurface hydrocarbon reservoir comprises porosity or permeability.

10. A method according to claim 1, further comprising:

outputting the model or parts thereof for display on a display screen to aid in understanding spatial distribution of characteristics of the subsurface geological formation.

11. A method according to claim 1, further comprising:

using the model to simulate fluid flow in the subsurface geological formation.

12. A method according to claim 1, further comprising:

calculating probabilistic results that demonstrate uncertainty in the model based on a quality or a quantity of input data.

13. A method according to claim 1, further comprising:

determining at least one additional product based on data generated by the trained machine learning ensemble.

14. A method according to claim 13, wherein:

the at least one additional product is selected from the group consisting of i) an uncertainty estimate, ii) a stochastic modeling algorithm that builds a realization of a spatial target variable of the model exploring an uncertainty space, and iii) non-linear estimates of exceedance probabilities, $P[Z(x)>c]$, which is a probability that a spatial target variable $Z$ at location $x$ is bigger than a cutoff $c$.

15. A computer system including a processor and computer memory storing a sequence of instructions that are executable on the processor, wherein the sequence of instructions is configured to carry out the method of claim 1.

16. A non-transitory computer readable medium storing a sequence of instructions that are executable on a processor, wherein the sequence of instructions is configured to carry out the method of claim 1.

17. A method according to claim 10, wherein the display provides a user interface comprising a set of user inputs, the set of user inputs comprising:

a defining of the target variable;

a defining of the first secondary variable;

a defining of the second secondary variable;

a defining of the external model; and a defining of a grid specifying the location.

* * * * *